2,696,606
Patented Dec. 7, 1954

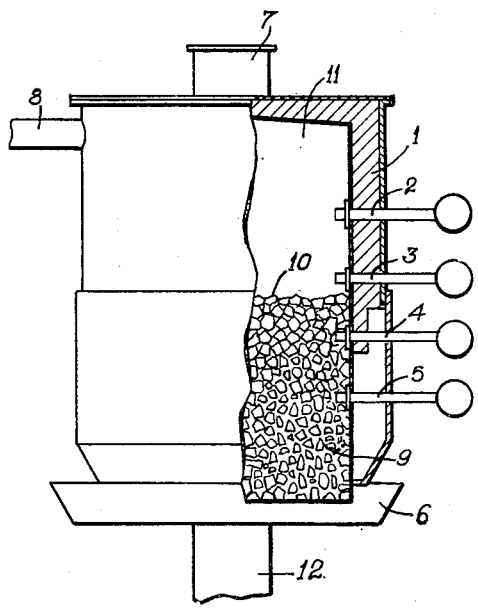

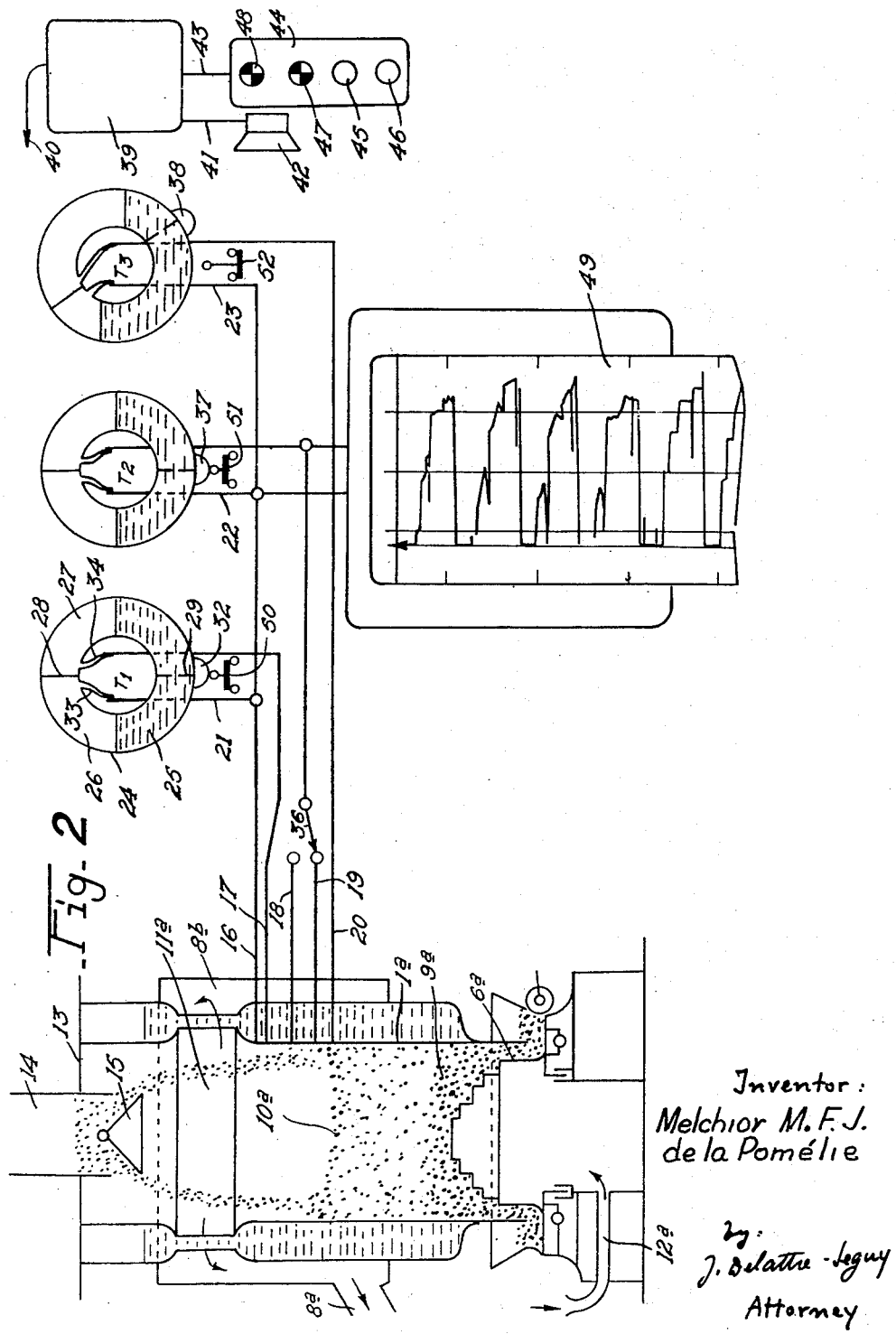

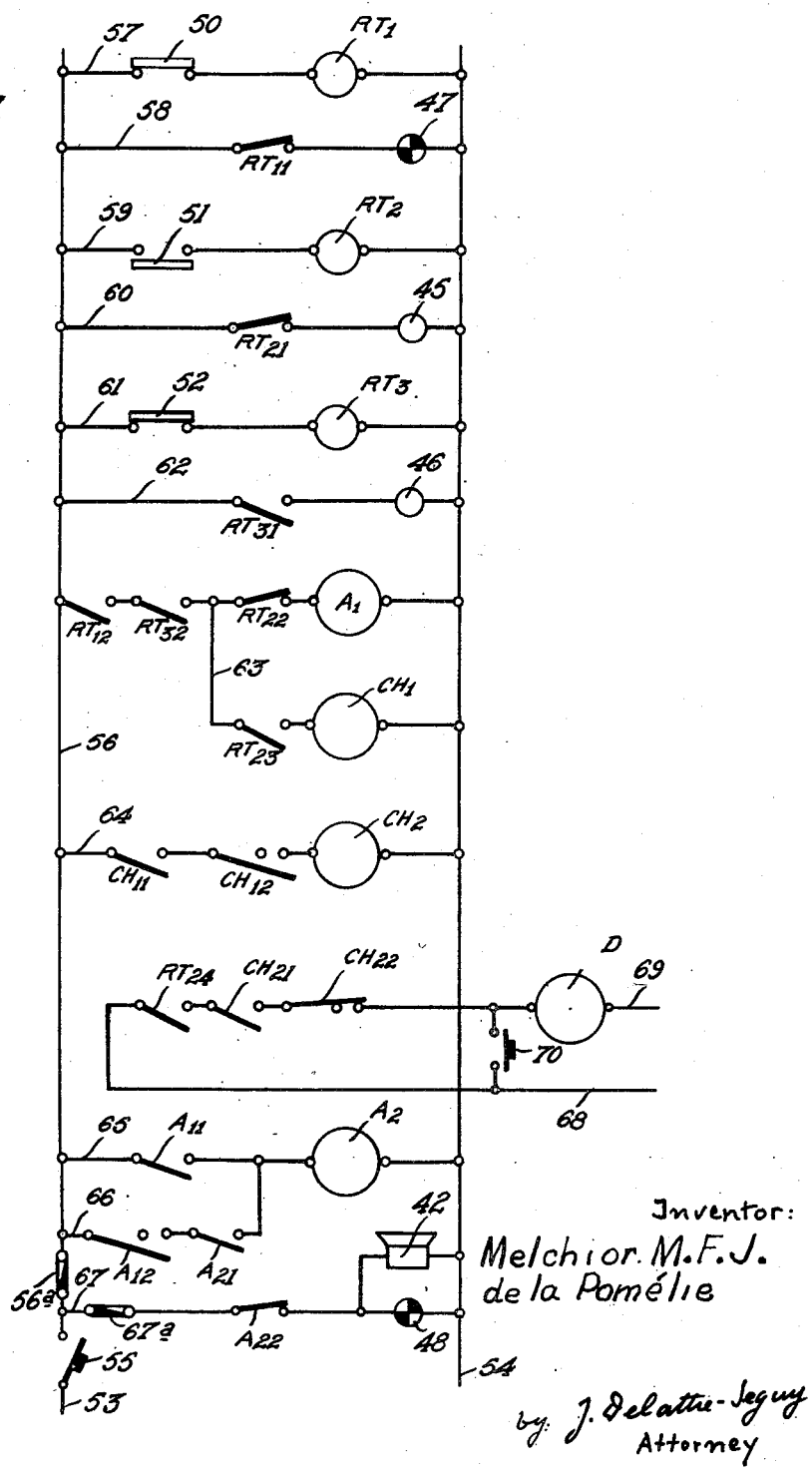

United States Patent Office

2,696,606

METHOD AND MEANS FOR DEFINING AND ADJUSTING THE LEVEL OF A LOAD OF SOLID MATERIAL INSIDE A NONTRANSPARENT CHAMBER

Melchior Marie Francis Jean de la Pomélie, Paris, France, assignor to Gaz de France (G. D. F.) Service National, Paris, France Application January 19, 1951, Serial No. 206,812

Claims priority, application France January 21, 1950

11 Claims. (Cl. 340—244)

My invention has for its object a method and means for defining and adjusting the level of a load of solid material inside a non-transparent chamber.

It also has for its object the chambers provided with such means.

According to a primary feature of my invention, the level of the load of solid material inside the non-transparent vat or chamber is obtained by comparing the pressures prevailing inside a gasiform fluid passing through the load inside the vat at different levels, as measured through tappings provided both above and below the level of the load.

A further object of the invention consists in providing through a level-defining method of the type described, a differential or a direct comparison between the pressures referred to.

According to a still further object of my invention, a stage of the method contemplated consists in resorting to the comparison of the pressures disclosed with a view to controlling the loading or unloading of the non-transparent chamber with solid material to obtain a predetermined level while producing, if required, an alarm signal warning the attendants that the actual level of the load of solid material has sunk too low or risen too high with reference to a predetermined level.

The present invention is chiefly applicable to the indication of the load of fuel inside a gas producer vat. It is also applicable in particular in the case of chemical industries, of steel-works and the like, in other words, each time it is desired to define the level of a load of solid material inside a non-transparent chamber.

The apparatus providing for the execution of the invention includes members adapted for measuring a pressure differentially and connected across two pressure-transmitting tappings, said pressure-sensitive members releasing through the agency of relays a loading device or an alarm signal.

According to a preferred embodiment, the pressure-sensitive members are constituted by closed annular pipes provided with partitions separating two compartments that are connected through a liquid column, the system constituted by said compartments and the liquid column connecting same being revolubly carried by a pivot. The correct release of the loading device is performed through such an apparatus that is associated preferably with at least one alarm signal that is released through pressure-sensitive members either when the level is too low or else when it is too high.

I obtain thus an apparatus controlling the loading of a chamber with solid material, chiefly applicable to the loading of a gas producer.

The following description of various embodiments of the invention illustrated in accompanying drawings will allow ascertaining readily the operation thereof. In said drawings:

Fig. 1 is a diagrammatic partly cross-sectional view of a gas producer vat provided with pressure-transmitting tappings for the execution of the method according to the invention;

Fig. 2 is a wiring diagram of the electrically controlled arrangement.

Fig. 3 is a wiring diagram of the circuit releasing the loading device or the alarm signal.

As illustrated in Fig. 1 showing a gas producer for industrial purposes through which passes a stream of gasiform fluid delivered by any suitable means not illustrated, the wall of the vat 1 is provided at different levels with tubes 2, 3, 4, 5 . . . connecting the inside of the vat with instruments measuring the pressure of the gasiform fluid at the levels at which said tubes open inside said vat. The gas producer vat 1 caps a hearth through which passes for instance the pipe 12 feeding the vat with air and steam. There is provided at the upper end of the vat 1, a loading aperture 7. A pipe 8 for throughput of the gas produced leads the latter to the storing and utilization means.

Inside the gas producer vat is introduced a solid load 9 of fuel the upper level of which is to be found at 10. Above said level is an empty space through which the gases produced pass freely on one hand while on the other hand the fuel loads are delivered into same gradually through the aperture 7, including a sluice or the like feeding means.

The four pressure-transmitting tubes or tappings 2, 3, 4 and 5 are arranged for instance in a manner such that the tappings 2 and 3 may be located above the normal level or average free surface of the fuel corresponding to standard operation of the gas producer while the tappings 4 and 5 or at least the tapping 4 is located far enough underneath the level 10 for the level of fuel never to sink beyond it, during normal operation.

The operation of the above described arrangement is as follows:

When the mixture of air and steam is introduced under pressure through the pipe 12, the gasiform stream passes through the load 9 that forms a porous body and the said stream is submitted to comparatively high losses of head the variations of which with the height of material through which the stream has to pass are fairly large. In contradistinction, as soon as the gasiform current has passed through the level 10 and has entered the empty space 11, there is practically no more loss of head and consequently no further noticeable modification in pressure.

Consequently, if pressure gauges are connected with the tappings 2 and 3, they should indicate substantially equal pressures. Pressure gauges connected with the tappings 2 and 3 should indicate pressures that increase in the ascending direction, the pressure in the tapping 5 being higher than the pressure in the tapping 4. It is thus easy to define the location of the first surface 10 as it is sufficient to look at the pressure gauges. If the pressures indicated for the tappings 2 and 3 are equal while the pressures indicated for the tappings 4 and 5 are not equal and differ from the value indicated for the tapping 3, this shows that the level 10 is located between the levels of the tappings 3 and 4.

During the operation of the gas producer, the surface 10 of the fuel sinks and when it reaches a level lower than that passing through the tapping 4, the pressures indicated for the tappings 2, 3 and 4 are all equal.

Measurements made with a gas-producer having a cross-section of 10 square meters and equipped with a grate such as that described and illustrated in my copending U. S. application Ser. No. 118,322 filed on September 28, 1949, for a Mechanical Grate, show that the pressures obtained for the different tappings assume values that are in conformity with the above disclosure.

If the tappings are equipped with mere pressure gauges, it is sufficient for the attendants to release the load to be delivered into the vat through the aperture 7 at the moment at which the pressures at the tappings 3 and 4 become equal to one another in order that the level of fuel may not sink too low. Similarly, for ascertaining the correct height of a load without the level of fuel rising too high, the attendants should stop the feeding of fuel as soon as the pressures at the tappings 2 and 3 cease being equal.

The behaviour of the pressures at the tappings may be obtained through differential pressure-measuring instruments associated with auxiliary devices that release, through a distant control system or through relays for instance, the operations consisting in feeding or reducing loads, said operations being controlled chiefly in the case of a load-reduction through adjustment of the speed of rotation of the grate of the type described in the above mentioned copending application; these pressure gauges may also release alarm signals in case the fuel level drops or rises to an exaggerated extent.

Any instruments sensitive to directly or differentially acting pressures may be used for connection with the above mentioned tappings. It should be noticed also that the pressure measuring instrument selected should operate according to the applications considered, through hit or miss or else in a gradual manner.

As apparent from inspection of Fig. 2, the complete arrangement includes a gas producer vat or tank 1a provided with a water jacket and the lower end of which carries a grate 6a adapted to remove the slag produced. This grate 6a includes blast pipes through which air and steam introduced under pressure from the pipe 12a are caused to enter the load 9a. The gases produced inside the fuel mass pass through the upper surface 10a of the load and arrive into the upper gas-containing part of the gas producer whence they enter the water jacket through openings that are not illustrated and they finally reach an outer casing 8b before being stored or led to the utilization apparatus through the pipe 8a.

The cover 13 of the gas producer tank is provided with a channel 14 adapted to feed fuel into the container and provided with an upper fluid-tight flap valve that is not illustrated and with a lower distributor cone 15. The loading operation includes the opening of the cone 15 for introducing the load, said opening being followed automatically by its closing and by the opening of the upper fluid-tight flap valve with a view to preparing the following load inside the sluice comprised between the flap valve and the cone, the cycle of operation terminating with the closing of the fluid-tight flap-valve.

Through the water jacket wall there pass five pipes 16, 17, 18, 19 and 20 that serve as pressure tappings, two of said pipes at least being located at a level lower than that reached normally during operation by the upper fuel surface 10a. The upper pipe 16 is connected through a branch pipe 21 with a first differential manometer T–1 while a second branch pipe 22 connects it with a second differential manometer T–2 and a third branch pipe 23 connects it with a third differential manometer T–3.

These differential manometers are of a well-known type and include a revolubly carried vertical torus-shaped chamber 24 partly filled with a liquid 25 in its lower portion so as to define thus two gas compartments 26 and 27 separated by a partition 28. In order to damp the oscillating movements of the liquid, a perforated partition 29 is located inside the torus-shaped chamber, said partition being diametrically opposed to the solid partition 28. The three differential manometers are constituted in a similar manner and carry cams 32, 37, 38 respectively, adapted to act each on a pusher member controlling an electric switch.

The compartments in the differential manometer T–1 are connected through the corresponding yielding pipes 33 and 34 on one hand with the branch pipe 21 and on the other hand with the tapping pipe 17. The torus-shaped chamber of the manometer T–2 is similarly connected with the branch pipe 22 and with the pipe 36 of a three-way distributing cock that allows the torus-shaped chamber considered to be connected selectively with the pipe 18 and with the pipe 19 according to the level of fuel that it is desired to obtain inside the gas producer. The torus-shaped chamber of the third manometer T–3 is connected again in a similar manner with the branch pipe 23 and with the tapping pipe 20.

The cam 32 of the manometer T–1 acts on the pusher member 50 controlling a switch in order to close said switch as soon as the chambers 26 and 27 in the manometer T–1 are at the same pressure. The operation is the same for the pusher member 37 in the manometer T–2 that closes the switch 51 under similar conditions. In contradistinction, the cam 38 on the manometer T–3 acts on the co-operating pusher member 52 for opening a switch when the pipes 23 and 20 are submitted to the same pressure.

The arrangement includes furthermore a relay chest 39 that is connected through leads 40 with the switches controlled by 50, 51 and 52, said chest being also connected through the leads 41 with an acoustic alarm device 42 and again through leads 43 with a luminous signboard 44 that includes at least one luminous signal 45 indicating normal level, a further luminous signal 46 indicating that the level has sunk too far, a luminous signal 47 indicating that the level has risen too high and a luminous signal 48 forming an alarm repeater.

It is of advantage to provide, in addition to the intermediary manometer T–2, a further differential manometer controlling a pen adapted to engage a record paper 49 advancing at a uniform speed with time and forming thus a pressure recorder. As a matter of fact, the manometer T–2 might as well be designed to provide this result directly.

The wiring diagram in the control chest 39 is illustrated in Fig. 3. This chest is fed with electric current through the agency of two leads 53 and 54 connected with an electric distribution network. In the wire 53 is inserted an energizing knob 55 connecting said wire 53 with a general feed wire 56 in which is inserted a safety circuit breaker 56–a. The wire 54 forms itself the other general distributing wire.

Between the general feed wires 54 and 56 are arranged in parallel the following control circuits:

A wire 57 feeding the energizing coil of a relay RT–1 in series with the switch 50 already mentioned;

A wire 58 feeding the luminous signal 47 in series with the blade RT–11 forming part of the armature of the relay RT–1;

A wire 59 feeding the energizing coil of the relay RT–2 with the insertion in series of the switch 51;

A wire 60 feeding the luminous signal 45 in series with the contact blade RT–21 belonging to the armature of the relay RT–2;

A wire 61 feeding the energizing coil of a relay RT–3 in series with the switch 52;

A wire 62 feeding the luminous signal 46 in series with a blade RT–31 belonging to the armature of the relay RT–3;

A circuit including in series a blade RT–12 belonging to the armature of the relay RT–1, a blade RT–32 belonging to the armature of the relay RT–3, a blade RT–22 belonging to the armature of the relay R–2 and the energizing coil A–1 of a relay;

Between the contact-piece closing the blade RT–32 and the blade RT–22 there starts a branch wire 63 in which are inserted in series a blade RT–23 of the relay armature RT–2 and the energizing coil CH1 of the means controlling the introduction of the load;

A wire 64 on which are mounted in series a blade CH–11 followed by a blade CH–12 the closing of which is delayed by about 50 seconds and a coil CH–2 of a second relay releasing the means controlling the introduction of the load;

A wire 65 including in series a blade A–11 belonging to the armature of the relay A–1 and the coil A–2 of the relay releasing the alarm device;

A wire 66 including in series a blade A–12 the opening of which is delayed by about 3 to 5 minutes and a blade A–21 the closing contact piece of which is connected with the closing contact piece of the preceding blade A–11 so that the relay A–2 is connected in parallel with A–11 and A–21;

A wire 67 including in series a safety circuit breaker 67a, a blade A–22 the closing contact piece of which is connected in parallel with the acoustic alarm 42 and with the optic alarm repeater 48 connected in parallel.

The arrangement includes, furthermore, a circuit for releasing the loading operation, said circuit including a wire 68 connected with one of the terminals of a current-distributing system and in which are arranged in series a blade RT–24, a blade CH–21, a second blade CH–22 the opening of which is delayed by 5 seconds, the coil of a relay adapted to start the loading operation through means not illustrated, the second terminal of the relay coil RD being connected with a wire 69 connected in its turn with the distributing mains, the relay RD being also adapted to be connected directly in the circuit through the manual operation of a pusher knob 70 short-circuiting the blades RT–24, CH–21 and CH–22.

The blades RT–11, RT–21, RT–22, CH–22 and A–22 are closed, when inoperative, while the blades RT–31, RT–12, RT–32, RT–23, CH–11, CH–12. RT–24, A–11, A–12, A–21 are open when inoperative. The blade CH–12 has its closing delayed by about 50 seconds; the blade CH–22 has its opening delayed by about 5 seconds and the blade A–12 has its closing delayed by about 3 to 5 minutes.

The operation of the arrangement described is as follows:

The pipe 36 on the three-way cock is connected either with the pipe 18 or with the pipe 19, according to the level it is desired to obtain. When the level 10a of the load is normal, said level 10a is located above the tapping 19 for instance but underneath the tapping 17. Under such conditions the pressures are equal in the compartments 26 and 27 of the manometer T–1 and the switch 50 is closed accordingly. The pressures inside the compartments of the torus-shaped chamber in the manometer T–2 are different and said torus-shaped chamber is angularly deflected, in other words, the switch 51 opens. The pressures are also unequal in the manometer T–3 and the switch 52 closes. The relay RT–1 is energized and the blade RT–11 is raised, whereby the luminous signal 47 is extinguished. The relay RT–2 is not energized so that the blade RT–21 remains in its contacting position and the corresponding luminous signal 45 for normal level is ignited. Lastly, the switch 52 being closed, the relay RT–3 is energized so as to close the blade RT–31 for igniting the luminous signal 46.

During the production of gas and under the action of the combustion and of the exhaust of the slag through the grate 6a, the level 10a sinks beyond the tapping 19. At this moment, the torus-shaped chamber T–2 enters its position of equilibrium and closes the switch 51. The relay RT–2 is energized and the blade RT–21 is raised whereby the luminous signal 45 is extinguished which means the level has sunk with reference to the level defined by the signals 46 and 45. The blades RT–12 and RT–32 that are now operative, allow energizing the relay A–1 through the blade RT–22 when still in its operative closed position, while the passage into inoperative position of said blade RT–22 together with the closing of RT–23 switches the current off the relay A–1 and closes the circuit 63 through the relay CH–1.

The blade CH–11 becomes then operative, as also the blade CH–12 after a duration of about 50 seconds in order to avoid any fortuitous pressure waves from producing a premature release. The relay CH–2 is thus energized while the operative blades RT–24 and CH–21 feed the blade CH–22 that is normally closed, which sends an energizing impulse through the release relay RD as the blade CH–22 becomes operative after a delay of a few seconds. The impulse given to the relay RD produces the starting of an arrangement that is not illustrated and that introduces a measured amount of fuel into the pipe 14. This fuel drops to the level 10a which rises and covers the tapping 19. The torus-shaped manometer T–2 is again deflected, which opens the switch 51 so as to produce the ignition of the normal level lamp 45. This shows that it is not possible to produce an undesired repetition of the loading operations which are entirely under control.

If, by reason of a fortuitous operation, the level 10a rises too much and reaches the tapping 17, the manometer T–1 is deflected and opens the switch 50. The relay RT–1 is de-energized and the blade RT–11 that is closed in its inoperative position ignites the signal lamp 47. The inoperative blade RT–12 switches off the feed of the releasing relays A–1 and CH–1. The blade A–11 drops together with the blade A–12, the latter breaking its circuit only after 3 to 5 minutes. The relay A–2 is de-energized and allows the blade A–22 to drop and to close the circuit feeding the alarm devices 42 and 48 so that the alarm is thus provided.

If the loading impulse has been given without the loading having been actually performed, the blade A–12 the opening of which is delayed by about 3 to 5 minutes, opens the circuit of A–2 which produces the closing of the blade A–22 and releases the alarm device.

If, as a consequence of another type of accident or faulty operation, the level 10a sinks too much, it uncovers the tapping 20 and the manometer T–3 enters its position of equilibrium whereby the switch 52 opens. The relay RT–3 is de-energized and the blade RT–31 returning into its inoperative position switches the current off. the signal lamp 46. The blade RT–32 opens and locks the feed circuit of the releasing relay A–1 and CH–1 so as to prevent the objectionable introduction of a load. The alarm is given under the same conditions as hereinabove. In the case of an accident having an electric origin, if the circuit-breaker 56a cuts off the feed through the wire 56, the alarm is also provided through de-energization of the relay A–2.

The introduction of the load is, however, controlled manually through the knob 70 if it is desired to introduce loads, otherwise than automatically, under the control of the attendants for starting the arrangement, for raising the level after a cleaning or for any other reason. It is also apparent that the clogging of one of the pressure tappings leads necessarily to the release of the alarm device.

Such an arrangement allows in the absence of any handicraft near by, producing automatically under control of the gas-producing operation the loading of an isolated gas producer or of all the gas producers of a battery, each of the gas producers being provided with an individual arrangement of the type disclosed hereinabove, the level and pressure indications being recorded, if desired, both near by and at a distance in a control and checking office. For such a battery of gas producers, it is possible to design common loading means associated with selecting means stopping the loading devices over that gas producer which requires being loaded and underneath a selected feed hopper of a hopper battery.

Obviously, without unduly widening the scope of the invention as defined in accompanying claims, it is possible to modify the embodiment disclosed. In particular, the number of tappings may be selected as desired along the wall of the treating vat and the control apparatuses are not necessarily apparatuses for introducing or extracting solid loads and they may as well be used for controlling and adjusting the output of the fluid passing through the vat, of its pressure or of its composition. Furthermore, the method is applicable to apparatuses other than gas producers; e. g. it may be used for controlling kilns, blast furnaces and the like. Again the fluids passing through the load and the vat may be constituted by liquids.

What I claim is:

1. An arrangement for defining the level of a load of solid products through which passes an ascending current of fluid and for adjusting said level at a predetermined height, comprising, in combination, means for measuring differentially the pressures of the fluid forming the current between two associated levels lying at heights respectively above and below the normal upper level of said solid load, and means for restoring the upper level of the solid load to the desired normal height whenever one of the differential pressure measurement means indicates a modification with reference to the differential measurement made when the upper level of the load is at normal height.

2. An arrangement for defining the level of a load of solid products through which passes an ascending current of fluid and for adjusting said level at a predetermined height, comprising, in combination, means for measuring differentially the pressures of the fluid forming the current between an upper level above the normal upper level of said solid load and various levels lying at different heights lower than that of said normal upper level, and means for restoring the upper level of the solid load to the desired normal height whenever one of the differential pressure measurement means indicates a modification with reference to the differential measurements made when the upper level of the load is at normal height.

3. An arrangement for defining and adjusting in a gas producer the level of the load of solid fuel through which passes an ascending current of fluid comprising, in combination, means for measuring differentially the pressures of the fluid passing vertically through the gas producer between associated levels lying respectively above and below the normal upper level of the fuel, and means for restoring the upper level of the solid load to the desired normal height whenever one of the differential pressure measurement means indicates a modification with reference to the differential measurements made when the upper level of the load is at normal height.

4. An arrangement for adjusting the level of a load of solid material inside a chamber containing the solid material through which an ascending current of fluid passes, said arrangement including a plurality of pressure-tapping means provided in the outer wall of the chamber at various levels located above and below the normal location of the upper surface of the mass of solid material, at least one differential manometer connected with two of said pressure-tapping means located respectively above and below said normal location, load feeding means, means controlling said load feeding means, and means for rendering operative said controlling means when the differential manometer indicates a modification with reference to the differential pressure corresponding to the registering of the upper surface of the solid material with its normal location.

5. An arrangement for adjusting the level of a load of solid material inside a treating chamber for said material through which an ascending current of fluid passes, comprising, in combination, four pressure-tapping means formed in the outer wall of the chamber at different levels, of which two tapping means are located above the normal level to be occupied by the upper surface limiting the solid material and the two others are located underneath said normal level, a first differential manometer connected between the upper tapping means and the immediately lower adjacent tapping means, a second differential manometer connected with the upper pressure-tapping means and the second next lower pressure-tapping means, a third differential manometer connected between the upper and the lowermost pressure-tapping means, means for introducing loads into the chamber, means controlling said load-introducing means, means for rendering operative said controlling means when the second differential manometer indicates equality in pressure between the corresponding tapping means, and means for rendering inoperative said controlling means when the third differential manometer indicates equality in pressure between the corresponding tapping means.

6. An arrangement for adjusting the level of a load of solid material, according to claim 5, wherein the means for controlling the load-introducing means and for rendering operative and inoperative, respectively, said controlling means, comprise an electric circuit connected with said load-introducing means, a normally open switch inserted in said electric circuit, means controlled by the second differential manometer for closing said switch when said manometer indicates equality in pressure between the corresponding tapping means, and means controlled by the third differential manometer for opening said switch when said third manometer indicates equality in pressure between the corresponding tapping means.

7. An arrangement for adjusting the level of a load of solid material, according to claim 6, wherein the means controlled by the second and third differential manometers comprise a first controlling relay adapted to be energized when the second differential manometer indicates an equality in pressure, a second controlling relay adapted to be de-energized when the third differential manometer indicates an equality in pressure, an intermediate relay the energization of which is controlled by the energization of said first controlling relay and avoided by the de-energization of said second controlling relay, said intermediate relay having an armature normally open and the closure of which is delayed when said intermediate relay is energized, and an impulse-producing relay having the switch of the load-introducing means circuit as armature and the energization of which is controlled by the closure of said delayed action armature, whereby said switch is closed when said impulse-producing relay is energized.

8. An arrangement for indicating the level of a load of solid material inside a treating chamber for said material through which an ascending current of fluid passes, comprising, in combination, four pressure-tapping means formed in the outer wall of the chamber at different levels, of which two tapping means are located above the normal level to be occupied by the upper surface limiting the solid material and the two others are located underneath said normal level, a first differential manometer connected between the upper tapping means and the immediately lower adjacent tapping means, a second differential manometer connected with the upper pressure-tapping means and the second next lower pressure-tapping means, a third differential manometer connected between the upper and the lowermost pressure-tapping means, three electrical luminous signalling devices for indicating whether the level of the upper surface limiting the solid material is actually located above the lower tapping means connected with any of the three differential manometers, three circuits for respectively feeding said signalling devices, and means controlled by said differential manometers for actuating said luminous signalling devices.

9. An arrangement for indicating the level of a load of solid material, according to claim 8, wherein the means controlled by the three differential manometers comprises two controlling relays adapted to be respectively energized when the first and second differential manometers indicate an equality in pressure, a third controlling relay adapted to be de-energized when the third differential manometer indicates an equality in pressure, two normally closed switches respectively inserted in two of the feeding circuits, said switches being respectively open when the first and second controlling relays are energized, and a normally open switch inserted in the third feeding circuit and closed when the third controlling relay is energized, whereby the firing of the three luminous signalling devices indicates that the level has risen too high, that of two luminous signalling devices indicates normal level and that of one luminous signalling device indicates that the level has sunk beneath said normal level, while the extinction of all three luminous signalling devices indicates that the level has sunk too far.

10. An arrangement for indicating that the level of a load of solid material inside a treating chamber for said material is abnormal, an ascending current of fluid passing through said material, comprising, in combination, four pressure-tapping means formed in the outer wall of the chamber at different levels, of which two tapping means are located above the normal level to be occupied by the upper surface limiting the solid material and the two others are located underneath said normal level, a first differential manometer connected between the upper tapping means and the immediately lower adjacent tapping means, a second differential manometer connected with the upper pressure-tapping means and the second next lower pressure-tapping means, a third differential manometer connected between the upper and the lowermost pressure-tapping means, electric devices for warning the attendants, a circuit for feeding said warning devices having a normally closed switch, and means controlled by said differential manometers for opening said switch whenever the level of the load sinks permanently underneath the lower tapping means of the second differential manometer and rises above the lower pressure-tapping means of the first differential manometer.

11. An arrangement for indicating that the level of a load of solid material is abnormal, according to claim 10, wherein the means controlled by the differential manometers comprises a first controlling relay adapted to be energized when the first differential manometer indicates an equality in pressure, a second controlling relay adapted to be energized when the second differential manometer indicates an equality in pressure, a third controlling relay adapted to be de-energized when the third differential manometer indicates an equality in pressure, an intermediate relay the energization of which is avoided by the energization of said second controlling relay and controlled by the simultaneous energization of said first and third controlling relays, said intermediate relay having an armature normally open and the closure of which is delayed when said intermediate relay is energized, and a fourth controlling relay having the switch of the warning device circuit as armature and the energization of which is controlled by the closure of said delayed action armature, whereby said switch is open when said fourth controlling relay is energized.

References Cited in the file of this patent

UNITED STATES PATENTS

| Number | Name | Date |
|---|---|---|
| 1,338,197 | Spencer et al | Apr. 27, 1920 |
| 1,549,968 | Grindle | Aug. 18, 1925 |
| 2,465,628 | Border | Mar. 29, 1949 |

FOREIGN PATENTS

| Number | Country | Date |
|---|---|---|
| 471,720 | Great Britain | Sept. 9, 1937 |
| 480,272 | Great Britain | Feb. 21, 1938 |